Dec. 11, 1962 O. CROMBERG ET AL 3,067,476

SLIDE FASTENER

Filed Nov. 5, 1957 5 Sheets-Sheet 1

INVENTORS
OTTO CROMBERG,
GUSTAV PRITZBUER,
WALTER WINTERHOFF by Mestern & Kollin
ATTORNEYS INVENTORS
OTTO CROMBERG,
GUSTAV PRITZBUER,
WALTER WINTERHOFF
by Mestern & Kollin
ATTORNEYS Dec. 11, 1962 O. CROMBERG ET AL 3,067,476

SLIDE FASTENER

Filed Nov. 5, 1957 5 Sheets-Sheet 3

INVENTORS
OTTO CROMBERG,
GUSTAV PRITZBUER,
WALTER WINTERHOFF
by Mestern & Kollin
ATTORNEYS INVENTORS
OTTO CROMBERG,
GUSTAV PRITZBUER,
WALTER WINTERHOFF
by Mestern & Kollin
ATTORNEYS INVENTORS
OTTO CROMBERG,
GUSTAV PRITZBUER,
WALTER WINTERHOFF
by Mestern & Kollin
ATTORNEYS United States Patent Office 3,067,476

Patented Dec. 11, 1962

3,067,476

SLIDE FASTENER

Otto Cromberg, Hagen, Westphalia, Gustav Pritzbuer, Hamburg, Walter Winterhoff, Wermelskirchen, and Hans Mayer, Hagen-Boele, Westphalia, Germany, assignors to Stahlwerk Kabel C. Pouplier Jr. G.m.b.H., Hagen-Kabel, Germany Filed Nov. 5, 1957, Ser. No. 694,632

Claims priority, application Germany May 18, 1954

13 Claims. (Cl. 24—205.11)

The present invention relates to slide fasteners in general, and in particular to such a slide fastener which is resistant to bending, laundering and pressing and which consists of two multiple-coil springs of equal pitch, each two opposing coils forming a unit for closing the fastener by their mutual engagement. The coils are attached by sewing them to two strips of fabric or similar material and are operated by a slide which engages with stops at the end.

This application is a continuation-in-part of application Ser. No. 503,525, now abandoned, filed by the same applicants on April 8, 1955.

Slide fasteners of the type described above have already been described in publications. However, due to lack of the necessary prerequisites for the practical application of these devices, it has been impossible to make any useful slide fastener of double-coil springs as above mentioned.

Attempts have been made to use single wires for making the two closure members; since it was proved that smooth single wire had no holding power, some manufacturers tried to shape the wires in such a manner as to form lugs, knobs or the like on the adjacent springs so that they would hold together in locking engagement. Shaped coil springs of this type are expensive to manufacture without having the necessary strength and accuracy which would guarantee successful use. Even small deformations in the shape of lugs, knobs or the like on adjacent springs will make the slide fasteners of this type impractical to manufacture and use.

Other suggestions were directed to making slide fasteners in which at least one of the two closure members is a composite of two or more juxtaposed coil windings arranged in contiguous or quasi-contiguous relationship as disclosed in U.S. Patent 2,346,024. In this slide fastener, the turns of the composite coil are supposed to engage as a group the turns of a second coil, the latter turns being separated by gaps narrower than corresponds to the width of the engaging coil turns.

These proposals do constitute a certain improvement. But while the adopted design seemed to promise very good results theoretically, the practical application again shows that such slide fasteners did not have sufficient strength and no lasting locking power.

The last mentioned proposal depended in the manufacture of slide fasteners from coil springs on an effective adherence of the inter-locking windings by friction. This, of course, would have meant a simple manufacturing process, since no particular shaping of the interlocking members would have been necessary. However, as mentioned before, the inter-locking by friction alone is not sufficient to fulfill the higher requirements which are made nowadays and which can be, for instance, expected to be met by box-catch fasteners. The operability of such coil-spring slide fasteners is not really guaranteed; it is not certain that the composite windings in each group will be in close engagement and the least displacement of the windings of the coil springs within the multiple coil leads to functional disturbances which make the entire slide fastener useless.

In the last-discussed examples it had been mentioned that coil springs should be made of resilient material, such as resilient plastics. One may not, however, use just any resilient material; it is of the greatest importance to use a material which has clearly defined properties of resilience and it is of the utmost significance appropriately to treat the material during processing.

It is the object of the present invention to provide a slide fastener which overcomes the above-mentioned shortcomings and which is simple to manufacture and dependable in use.

According to the invention the slide fastener comprises coil springs made from a resilient corrosion-proof material and the strips of fabric, to which the coils are fastened have an elongation of, at the most, 4% in the direction of the warp and a residual shrinkage, after boiling and drying, of at the utmost 3% in the direction of the warp; the ratio of the outer diameters of the coils ($a$) and the diameters of the wire ($b$) should have the constant value of $$\frac{a}{b}=6.667\pm 5\%$$

the pitch angles $\alpha$ of the coil springs in both closure members should lie between 10° and 14°; finally, the pitch is calculated according to the formula $$s=\tan\alpha\times\pi\times(a-b)$$

The slide fastener according to the invention has a holding strength not known in any slide fastener up to the present. It owes the superior quality to several factors. One of these is the resilient corrosion-proof material of the springs. Another is the type of material to whose edges the coil springs are secured.

By using a fabric as defined, having an elongation of, at the utmost, 4% and a residual shrinkage after boiling and drying of, at the utmost, 3% in the direction of the warp, the turns of one closure member will be evenly oriented with respect to the gaps between turns of the other member whereby a faultless engagement of the windings of both members will be guaranteed.

A further guaranty of proper functioning is given by the above described selection of the dimensions of the multiple coil springs according to the invention.

According to one embodiment the coils of the two closure members are so formed that the pitch angles $\alpha$ and the wire diameters $b$ are the same in both coils, and the pitch $s$ is also the same. In another embodiment, only the pitch $s$ is the same, while the pitch angle $\alpha$, the wire diameter $b$, and the outer diameter of one winding $a$ is different in one coil from that of the opposing coil.

The material to be used is rust-resistant chrome-nickel steel having a minimum strength of 200 kg./m.$^2$, and this material is treated for elimination of winding tensions and for increase of resilience after cold shaping, by heat treatment at temperatures ranging from 200–450° C. for 10 minutes. Chrome-nickel steel is corrosion-proof without further pre-treatment. The use of such steel guarantees that the wire will meet the higher requirements of uniformity which is necessary for the multiple-coil springs according to the invention.

It is sometimes desirable to carry out the heat treatment of the finished coil springs under a protective gas or, in other words, in an oxygen-free atmosphere.

One desirable feature of the coils according to the invention is the possibility of coloring them electro-chemically.

According to a further embodiment of the invention the material may be a resilient, corrosion-proof synthetic material.

While it is in many cases desirable to use strips of fabric which will provide a completely straight path for the slider in opening and closing the coil springs, there may be some uses where it is desired for the slide to have an arcuate path. In this case the strip of fabric may likewise have to be curved and materials of other shrinkage properties than those defined above may be required.

In any case, the slide fastener according to the invention will have the highest degree of dependability in staying closed while being bendable or even twistable when necessary. The slide fastener should do away once and for all with the notion that slide fasteners consisting of closure members of smooth resilient coil spring cannot meet the highest specifications set by modern standards.

As regards the known sliders for spring-coil slide fasteners, these, too, have disadvantages which hamper proper functioning of the fasteners. When they are made by injection molding, they are not sufficiently wear-resistant in order to withstand the sliding movement without impairment; the admission channels for the coil springs are widened rapidly so that a faultless guiding of the windings toward each other for mutual engagement until locking occurs becomes unfeasible after short use. Premature opening of the fastener will also occur.

Sliders made by stamping could likewise not be made with the required precision and stability; this was due mainly to the fact that the order of the resistance forces occurring upon closing of the spring coils was not sufficiently known.

The shaping of a slider in accordance with the invention eliminates the problems of manufacture and permits to provide a slider which is capable of withstanding any stress during prolonged use not only by virtue of a novel shape, but also on account of the selection of the most suitable material.

According to the invention stampings made of corrosion-proof material are shaped similar to bowls having deeply dished heart-shaped portions which are so combined that the lateral admission channels for the separate coils will form, from the heart-shaped portion to the discharge opening, a conically converging channel for the closed slide fastener; one bowl has a cap attached thereto which serves for housing a handle and a locking member combined therewith in the form of a bent leaf spring or round spring which, after closure of the slide fastener, projects into the gaps between the windings of the coil springs and locks the slide when the handle is moved into a position parallel to the slide movement of the closure members. The slide is so formed, more particularly, the bowls are so dished that the remaining heart-shaped halves, after welding together, form lightly bent guiding channels which permit an almost frictionless joining of the closure units at the main channel. The shaping of the heart-shaped member and the use of highly wear-resistant material renders it possible to attain a stability which excludes undesired opening of the slide fastener.

The stops at the top and bottom ends have likewise to be appropriately shaped. The known stops arranged at the top of coil, spring fasteners are not of sufficient strength over a long period of wear. Likewise, the arrangement of the fastening elements between coil springs and strips of fabric do not fulfill the requirements of pleasant appearance which would meet modern standards, particularly in view of the fact that in the conventional box-type slide fasteners satisfactory solutions have been found. It is, therefore, an object of the invention to provide stop elements which are of high strength and pleasant appearance.

According to the invention, the problem is solved first by using corrosion-resistant material and then by making upper stop elements for the slider movement in the form of rivets or studs which project axially into the upper ends of the coil spring and are secured thereto, while as fastening members of the rivet shaft to the length of material, supports such as sleeves are provided surrounding the ends of the coil springs below the head of the rivets in the manner of a hinge; these sleeves may be made of metal, plastic, or tape, for instance gummed tape.

For the lower stops, too, it was necessary to provide novel members, since the stop members hitherto used for coil spring slide fasteners were not sufficiently resistant to the continual thrust of the slider hitting against them, so that frequently the woof threads of the fabric are destroyed and the stop members are torn out of the fabric.

According to the invention, a very wear-resistant stop element of pleasant appearance is made for limiting the downward movement of the slider by using a stamping which, as regards its width as well as its height, is slightly smaller than corresponds to the locked closure units; also, reinforcement straps are used consisting of metal, plastic, or tape, such as gummed tape, which are wrapped around the strip of fabric of the single closure member or of the locked members and are secured to the fabric. The stampings, and, if desired, also the metal reinforcements, may be made of the same material which is used for the coil springs and the other closure parts of the slide fastener.

The lower stop members are, therefore, made of stampings of corrosion-resistant material which have a mouth-like opening for receiving the locked closure unit in tight relationship. The stamping has lateral jaws to be clamped about the strips of fabric which at the clamping points are reinforced by continuous or divided reinforcement straps of metal, plastic, or other material, for instance gummed tape.

A novel slide fastener with separable ends, which is to be practical and economical, is made according to the invention as follows:

The multiple coil springs are welded at the ends; one winding is then stretched and so sewn unto the strip of fabric that the wire (3 or 4 mm. long) is secured by the seam and is anchored in the edge of the fabric. As mentioned above, the ends of the fabric of both halves of the slide fastener are reinforced by straps of, for instance, gummed tape, in order to afford a strong anchorage for the stampings to be mounted thereon. The closure units are riveted at their lower ends to two stampings of steel, plastic, and the like which are of different shape. The strips of fabric are likewise riveted thereto. Furthermore, one of these stampings is additionally secured to a bottom guide and stop member, whereas the second stamping which has an arcuate guiding edge, is slid into this bottom member after being passed through the slider.

For fixation of the last coil turn, both stampings have projecting tongues of such width that they will fit into the gaps between the turns and the tongues are staggered in height from left to right by half the pitch of a turn whereby a joining of the left-hand and right-hand closure units by the slider is accomplished in the desired manner.

The stamping which is slidable is also riveted to the reinforced strip of fabric and thereby secured in its position. The above-mentioned guiding edge serves as a guide during the insertion of the slidable stamping into the bottom member. In mounted condition, the insert part is of U-shape.

As already mentioned, chrome-nickel steel is a very desirable resilient material for making the slide fastener according to the invention.

In the following, a number of examples are given to illustrate the slide fastener according to the invention. These examples show, more particularly, the importance of the heat treatment of the spring steel and the significance of the pitch angle, the wire diameter, the diameter of the coil winding, and of the pitch, for the properties of the slide fastener.

The test series given below exemplifies the influences of the heat treatment on the strength of material. As the strength increases, so does the elastic limit, and both contribute in increasing the adherence, rigidity, and bending strength of the slide fastener.

On cold-shaping of the spring steel wire, the strength decreases by 10–20%. By the heat treatment thereafter, not only is the original strength recovered, but it increases suddenly so as to reach the lower limit of the desired strength at 200° C. From there on, a steady increase of the strength is noted, which, after reaching a maximum, changes again to a decrease until, at 450° C., a value is reached which corresponds to the strength at 200° C. Upon further heating, the values keep on decreasing.

The duration of the heat treatment has no particular importance, but 10 minutes at the desired temperatures is the minimum period.

*Test Series*

Effect of after-treatment temperature on the strength of chrome-nickel-steel wire of 0.297 mm. diameter after one half hour.

(*a*) Initial strength 202 kg./mm.², heating time ½ hour.

| Temperature: | Strength, kg./mm.² |
|---|---|
| 180° C. | 210 |
| 200° C. | 215 |
| 220° C. | 216 |
| 250° C. | 217 |
| 350° C. | 220 |
| 380° C. | 223 |
| 400° C. | 221 |
| 420° C. | 218 |
| 450 C. | 214 |

(*b*) Initial strength 227 kg./mm.², heating time ½ hour.

| Temperature: | Strength, kg./mm.² |
|---|---|
| 190° C. | 240 |
| 200° C. | 243 |
| 220° C. | 244 |
| 350° C. | 252 |
| 380° C. | 253 |
| 400° C. | 251 |
| 420° C. | 248 |
| 450° C. | 243 |

Example of determination of dimensions of multiple coil springs according to the present invention.

Ratio of diameters:

$$\frac{\text{Outer diameter of winding } (a)}{\text{Wire diameter } (b)}=6.667$$

The pitch $s$ equals $\tan \alpha \times \pi \times (a \text{ and } b)$.

The pitch angle is between 10°–14°.

(1) Both coils are equal as regards $a$, $b$, $\alpha$ and $s$.

Given are:

$$a_1=a_2=2.00 \text{ mm.}$$
$$\alpha_1=\alpha_2=12°$$

Find:

$$b_1=b_2$$
$$s_1=s_2$$
$$b_1=b_2=\frac{a}{6.667}=\frac{2.00}{6.667}=0.30 \text{ mm. (for a wire)}$$
$$s_1=s_2=\tan \alpha \times \pi \times (a-b)=0.2126\times 3.14\times 1.7=1.135 \text{ mm.}$$

(2) The two coils differ as regards $b$ and $\alpha$.

Given are:

$$b_1=0.18 \text{ mm.} \qquad b_2=0.20 \text{ mm.}$$
$$\alpha_1=12°23' \qquad s_2=s_1$$

Find:

$a_1$ and $s_1$ — $a_2$ and $\alpha_2$ $$a_1=b_1\times 6.667=0.18\times 6.667=1.200 \text{ mm.} \qquad a_2=b_2\times 6.667=0.2\times 6.667=1.333 \text{ mm.}$$

$$s_1=s_2=\tan \alpha_1 \times \pi \times (a_1-b_1)=0.2195\times 3.14\times 1.02=0.705 \text{ mm.}$$

$$\tan \alpha_2=\frac{s}{\pi \times (a_2-b_2)}=\frac{0.705}{3.14\times 1.133}=0.1978$$
$$\alpha_2=11°10'$$

(3) Both coils are unequal as to $a$ and $\alpha$.

Given are:

$$a_1=1.933 \text{ mm.} \qquad a_2=2.0668 \text{ mm.}$$
$$\alpha_1=12°25' \qquad s_2=s_1$$

Find:

$b_1$ and $s_1$ — $b_2$ and $\alpha_2$ $$b_1=\frac{a_1}{6.667}=\frac{1.933}{6.667}=0.29 \text{ mm.} \qquad b_2=\frac{a_2}{6.667}=\frac{2.0668}{6.667}=0.31 \text{ mm.}$$

$$s_1=s_2=\tan \alpha \times \pi \times (a_1-b_1)=0.2202\times 3.14\times 1.643=1.135 \text{ mm.}$$

$$\tan \alpha_2=\frac{s}{\pi \times (a_2-b_2)}=\frac{1.135}{3.14\times 1.7568}=0.2058$$
$$\alpha_2=11°38'$$

Figure 7:
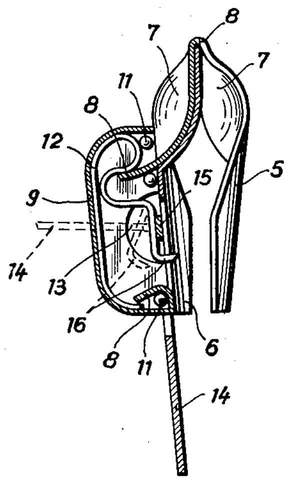
Figure 6:
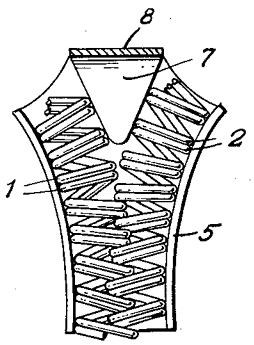
Figure 8:
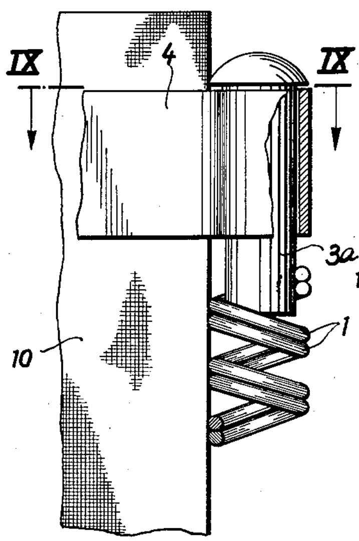
Figure 10:
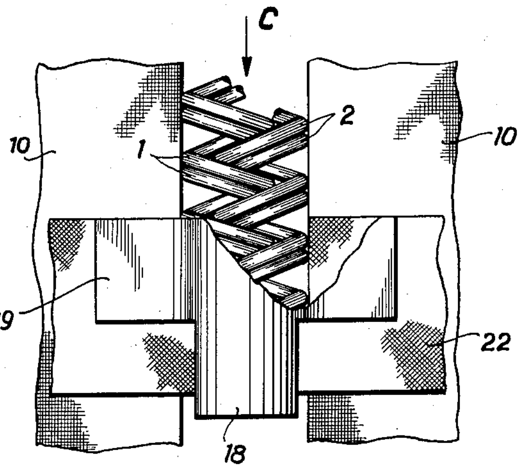
Figure 9:
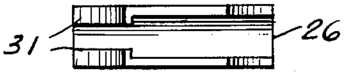
Figure 11:
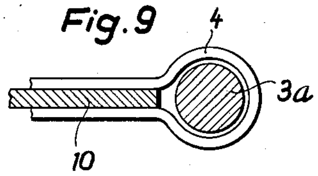
Figure 12:
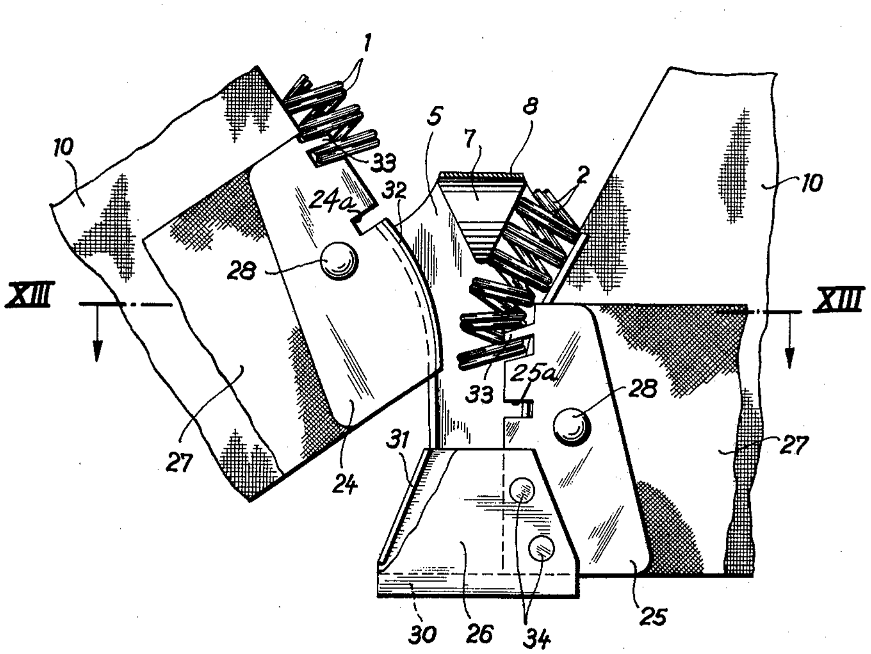
Figure 13:
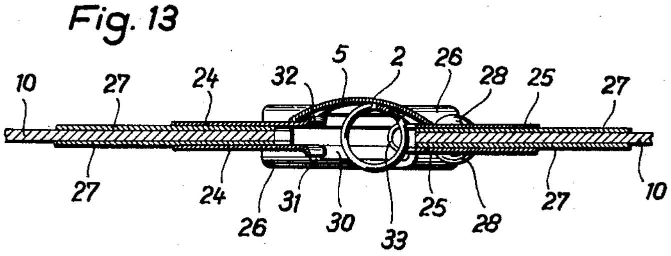

FIGS. 4*a*, 4*b* and 5*a*, 5*b* similarly illustrate two opposed windings;

FIG. 6 illustrates the bottom part of the slider with inserted multiple-coil springs;

FIG. 7 is a side view of the same parts, partly in section;

FIG. 8 is a front view of the upper stop;

FIG. 9 is a section on line IX—IX of FIG. 8;

FIG. 10 is the bottom stop in front view;

FIG. 11 illustrates the stop of FIG. 10 as viewed in the direction of arrow C but without the coil spring being shown;

FIG. 12 illustrates part of a separable bottom stop in partly assembled position;

FIG. 13 is a section along line XIII—XIII of FIG. 12; and

Figure 16:
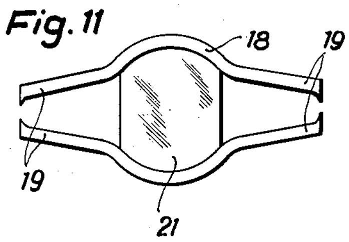
Figure 14:
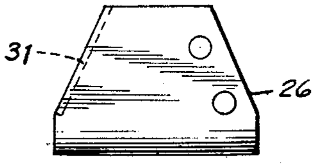
Figure 15:
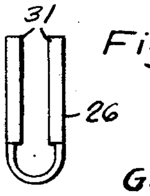

FIGS. 14–16 are, respectively, front-elevational, side-elevational and plan views of a channel member according to the invention.

Figure 1:
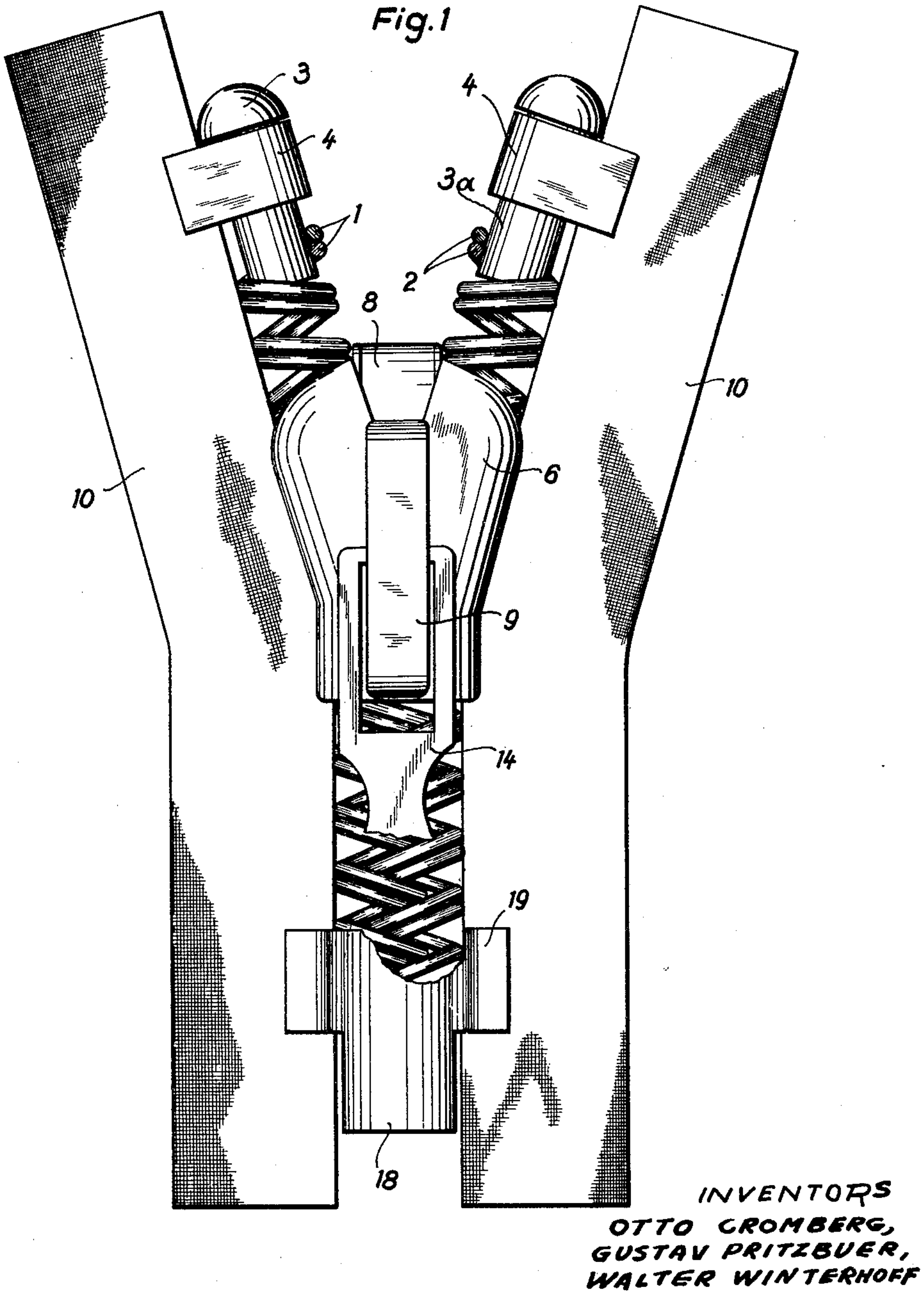
FIG. 1 illustrates the slide fastener according to the invention.

Referring now to the drawings, double-coil springs 1 and 2 are shown attached to strips of fabric 10. At the top the springs have each secured thereto, for instance, by spot welding, a rivet 3 (FIGS. 1, 8 and 9). The head 3 of the rivet protrudes over the end of the coils and the shaft 3*a* of the rivet is received in a sleeve 4 secured to the associated strip of fabric, e.g. by gluing. The shaft 3*a* of the rivet is loosely guided in the sleeve 4 and acts upon opening and closing of the slider in the manner of a buffering member.

The slide to be used in the slide fastener according to the invention is more fully shown in FIGS. 6 and 7. It substantially consists of stampings 5 and 6 which are bowl-shaped and include each a deeply dished heart-shaped portion 7 each at the center of the admission end of the separable slide fastener. The heart-shaped portions 7 are welded together and divide the space enclosed by the stampings 5 and 6 into two channels, diverging in an evenly curved arc. Lugs 8 and 8*a*, bent over to the left as viewed in FIG. 7, are formed as integral extensions of right-hand bowl 5 and left-hand bowl 6 as viewed in FIG. 7 of the slide, respectively said lugs projecting like barbs from the left-hand stamping 6, and carrying a cap 9 which is fastened to the lugs 8, 8*a* by pressing in indentations 11. A spring 12 is arranged in cap 9; also mounted inside of the cap is a pivotable handle 14 projecting through an opening 13 in the cap. This handle has a cross-bar 15 which is pressed down by spring 12 and normally maintains the handle parallel to the direction of travel of the slide. The spring has also a bent-over extremity 16 capable of entering between turns of the coils 1 and 2, whereby the slider is locked against movement. In order to disengage the lock, the handle 14 is placed at right angles to the sliding path, whereby cross-bar 15 lifts the extremity 16 of the spring and unlocks the slider. Thus, the slide is movable when handle 14 stands perpendicular to the direction of its travel as shown in dotted lines in FIG. 7.

FIGS. 10 and 11 show an embodiment of the lower stop member for the slider, which consists of a stamped sleeve portion 18 clamped about the strips of fabric 10 by means of jaws 19. In FIG. 11 the reference numeral 21 represents the lower closing bridging portion about which the two flange parts of part 18 are bent to receive the ends of the locked coil springs 1 and 2, and part 18 is functioning as a bearing for accommodating the locked coil springs 1, 2, said bearing being slightly narrower than the locked springs and capable of compressing the same. At this point, the strips of fabric 10 are reinforced by ribbons or straps 22 attached thereto.

FIGS. 12–16 illustrate a separable stop arrangement. The ends of the strips 10 have differently shaped stop elements 24 and 25 attached thereto, one of which is a stationary element secured to an end channel portion 26 by rivets 34. Slots 24*a* and 25*a* in members 24 and 25 are provided for the adjustment of these parts with respect to their fastening to the adjacent material strips. The adjustment is necessary, in order to set the correct insertion point for the engaging parts in view of the insertion part 26. The strips 10 are reinforced by ribbons 27, where stop elements 24 and 25 are riveted to the material at 28. Both ends of the coils are rotatable with respect to the strips and are movable in slots 24*a*, 25*a*. At the channel portion 26, inturned ledges 30 are provided which define the necessary clearance for receiving stop element 24. This element has outwardly bent guide edges 32 which are slidable along a guide flange 31 of channel portion 26. The edges 32 are curved so as to correspond to the entrance channel of the slider. Elements 24 and 25 are formed with small projections or tongues 33 thereon which are capable of engaging gaps between turns of coils 1 and 2. The projections 33 are staggered by half the pitch of the coil springs when the coils are in interlocked position.

Figure 2:
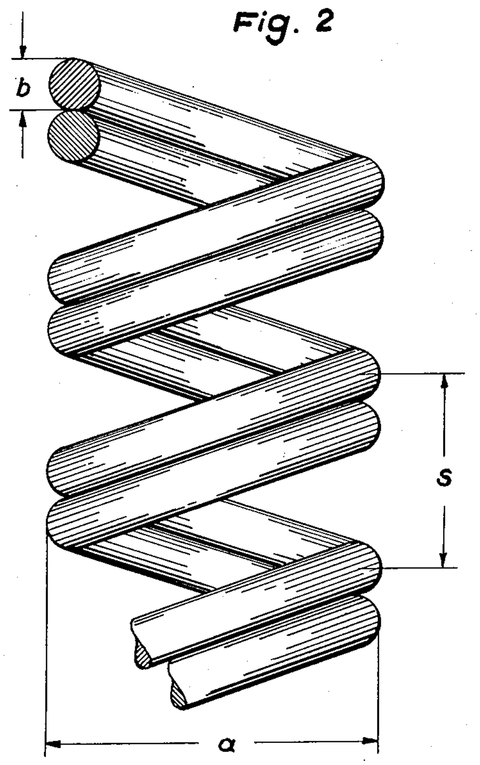
FIG. 2 is part of a coil forming a closure member.
Figure 3:
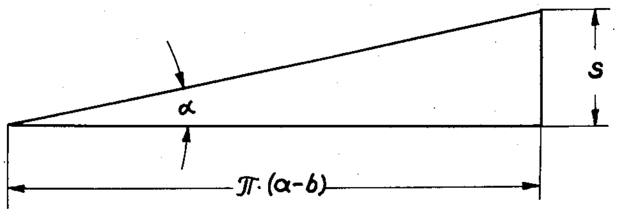
FIG. 3 is a diagram of one developed coil.

The dimensions of the coil springs of the slide fastener are defined as follows: The pitch angle $\alpha$ (FIGS. 2 and 3) is between 10° and 14°, and the outer diameter $a$ is 6.667 times the wire diameter $b$. The pitch $s$ can be determined by $\tan \alpha \times \pi \times (a-b)$. It is now possible to make the dimensions of both coil members equal as shown in FIGS. 4*a* and 4*b*, or unequal as shown in FIGS. 5*a* and 5*b*, with the exception of the pitch $s$ which is again equal.

Figures 4A, 4B:
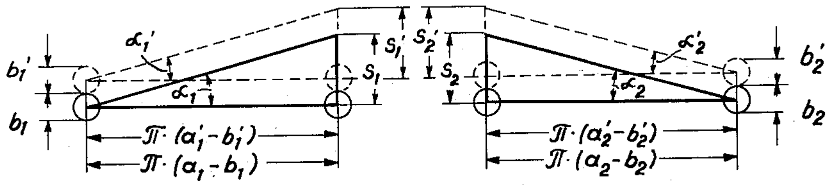

In the embodiment shown in FIGS. 4*a* and 4*b*, the coils on both sides have equal wire diameter $b$ and equal pitch angle $\alpha$. The outer diameter according to the formula $b \times 6.667$ and the pitch according to the formula $$\tan \alpha \times \pi \times (a-b)$$

is equal for both coils.

Figures 5A, 5B:
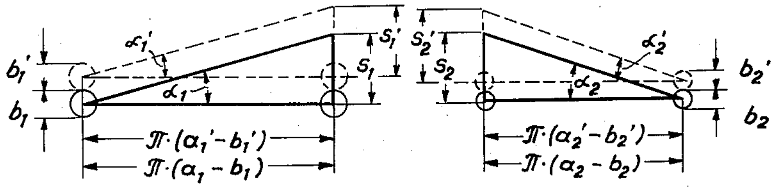

According to FIGS. 5*a* and 5*b*, the wire diameter $b_1$ is different from $b_2$. Thereby, the outer diameter of the coil winding according to the formula $b \times 6.667$ is likewise different since the factor $b$ in the formula is different on both sides. At the same time, the factor $\pi \times (a-b)$ is different, and as a consequence thereof, with an even pitch $s$, angle $\alpha$ is different in each coil. Therefore, only one value between 10° and 14° is selected for the angle $\alpha$ of one coil, whereupon the pitch of the coil is determined according to the formula $s = \tan \alpha \times \pi \times (a-b)$ and by insertion of the values of the second coil and the pitch $s$ into the latter formula, $\tan \alpha$ and $\alpha$ itself is calculated for the second coil from the formula $$\tan \alpha = \frac{s}{\pi \times (a-b)}$$

What we claim is:

1. A slide-fastener half comprising a strip of flexible material, an elongated coil spring extending along an edge of said strip externally of the latter while being secured thereto with spaced-apart turns, and a pair of stops fastened to said strip at opposite extremities of said spring and anchored to said extremities, at least one of said stops engaging the corresponding extremity with freedom of rotation of the latter relative to said strip about an axis parallel to said edge, said one of said stops including a support secured to said strip and a guide stud extending from said support in spaced relationship with said edge axially into said coil spring at said corresponding extremity.

2. A slide-fastener half comprising a strip of flexible material, an elongated coil spring extending along an edge of said strip externally of the latter while being secured thereto with spaced-apart turns, and a pair of stops fastened to said strip at opposite extremities of said spring, each of said stops engaging the corresponding extremity with freedom of rotation of the latter relative to said strip about an axis parallel to said edge, at least one of said stops including a support secured to said strip and a guide stud extending from said support in spaced relationship with said edge axially into said coil spring at a respective extremity thereof.

3. A slide-fastener half comprising a strip of flexible material, an elongated coil spring extending along an edge of said strip while being secured thereto with spaced-apart turns, and a pair of stops fastened to said strip at opposite extremities of said spring and anchored to said extremities, one of said stops including a sleeve attached to said strip in alignment with said spring and a stud rotatably held in said sleeve, said stud having one end rigidly connected with the adjacent extremity of said spring and having its other end provided with a head preventing withdrawal of said stud from said sleeve.

4. A slide-fastener half comprising a strip of flexible material, an elongated coil spring extending along an edge of said strip while being secured thereto with spaced-apart turns, and a pair of stops fastened to said strip at opposite extremities of said spring and anchored to said extremities, one of said stops including a sleeve attached to said strip in alignment with said spring and a stud rotatably held in said sleeve, said stud having one end rigidly connected with the adjacent extremity of said spring and having its other end provided with a head preventing withdrawal of said stud from said sleeve, the other of said stops including an element attached to said strip and provided with an edge projecting beyond said edge of said strip, said projecting edge having an indentation rotatably receiving the last turn of the other extremity of said spring.

5. A slide-fastener half comprising a strip of flexible material, an elongated coil spring extending along an edge of said strip while being secured thereto with spaced-apart turns, and a pair of stops fastened to said strip at opposite extremities of said spring and anchored to said extremities, one of said stops including a sleeve attached to said strip in alignment with said spring and a stud rotatably held in said sleeve, said stud having one end rigidly connected with the adjacent extremity of said spring and having its other end provided with a head preventing withdrawal of said stud from said sleeve, the other of said stops including an element attached to said strip and provided with an edge projecting beyond said edge of said strip, said projecting edge having a pair of recesses separated by an inclined tongue, said recesses respectively receiving with freedom of rotation the last two turns of the other extremity of said spring, said tongue entering between said last two turns and having a width equal to the spacing between any two consecutive turns of said spring.

6. A slide-fastener half comprising a strip of flexible material of substantially invariable length, an elongated coil spring of uniform pitch and diameter extending along an edge of said strip while being secured thereto with spaced-apart turns, and a pair of stops fastened to said strip at opposite extremities of said spring and anchored to said extremities, one of said stops including a sleeve attached to said strip in alignment with said spring and a stud rotatably held in said sleeve, said stud having one end rigidly connected with the adjacent extremity of said spring and having its other end provided with a head preventing withdrawal of said stud from said sleeve.

7. A slide-fastener half comprising a strip of flexible material of substantially invariable length, an elongated coil spring of uniform pitch and diameter extending along an edge of said strip while being secured thereto with spaced-apart turns, and a pair of stops fastened to said strip at opposite extremities of said spring and anchored to said extremities, one of said stops including a sleeve attached to said strip in alignment with said spring and a stud rotatably held in said sleeve, said stud having one end rigidly connected with the adjacent extremity of said spring and having its other end provided with a head preventing withdrawal of said stud from said sleeve, the other of said stops including an element attached to said strip and provided with an edge projecting beyond said edge of said strip, said projecting edge having a pair of recesses separated by an inclined tongue, said recesses respectively receiving with freedom of rotation the last two turns of the other extremity of said spring, said tongue entering between said last two turns and having a width equal to the spacing between any two consecutive turns of said spring.

8. A slide-fastener half comprising a strip of flexible material, an elongated coil spring extending along an edge of said strip externally of the latter while being secured thereto with spaced-apart turns, said spring consisting of a plurality of identical resilient coils co-axially interleaved and contacting one another along their entire length, and a pair of stops fastened to said strip at opposite extremities of said spring, said coils being rigidly interconnected at said extremities, said stops engaging said extremities with freedom of rotation by each extremity relative to said strip about an axis parallel to said edge, at least one of said stops including a support secured to said strip and a guide stud extending from said support in spaced relationship with said edge axially into said coil spring at a respective extremity thereof.

9. A slide-fastener half comprising a strip of flexible material, an elongated coil spring extending along an edge of said strip while being secured thereto with spaced-apart turns, said spring consisting of a plurality of identical resilient coils co-axially interleaved and contacting one another along their entire length, and a pair of stops fastened to said strip at opposite extremities of said spring and anchored to said extremities, one of said stops including a sleeve attached to said strip in alignment with said spring and a stud rotatably held in said sleeve, said stud having one end rigidly connected with the adjacent extremity of said spring and having its other end provided with a head preventing withdrawal of said stud from said sleeve.

10. A slide-fastener half comprising a strip of flexible material of substanitally invariable length, an elongated coil spring of uniform pitch and diameter extending along an edge of said strip while being secured thereto with spaced-apart turns, said spring consisting of a plurality of identical resilient coils co-axially interleaved and contacting one another along their entire length, and a pair of stops fastened to said strip at opposite extremities of said spring and anchored to said extremities, one of said stops including a sleeve attached to said strip in alignment with said spring and a stud rotatably held in said sleeve, said stud having one end rigidly connected with the adjacent extremity of said spring and having its other end provided with a head preventing withdrawal of said stud from said sleeve.

11. In a slide fastener, in combination, two substantially co-extensive strips of flexible material of substantially invariable length having facing edges spacedly extending alongsisde each other and forming a gap therebetween, a pair of elongated coil springs of uniform pitch and diameter extending within said gap adjacent said facing edges, respectively, while being secured thereto with spaced-apart turns, at least some of the turns of one of said springs interlinking with corresponding turns of the other of said springs, and stop means fastened to said strips at opposite extremities of each of said springs, said stop means including a male element attached to one of said strips and a female element attached to the other of said strips opposite said male element, said female element having an extension bridging said gap and detachably receiving a part of said male element, each of said elements being provided with an edge projecting into said gap, each of said projecting edges having a pair of recesses separated by an inclined tongue, said recesses respectively receiving with freedom of rotation the last two turns of the adjacent extremity of a respective one of said springs, said tongue entering between said last two turns and having a width equal to the spacing between any two consecutive turns of each of said springs, said stop means further including a pair of sleeves respectively attached to said strips at the opposite extremities of said springs and projecting into said gap in alignment with said springs, each of said opposite extremities being provided with a stud rigidly connected therewith and rotatably received in the adjacent sleeve, said stud having a head preventing its withdrawal from the respective sleeve.

12. In a slide fastener, in combination, two substantially co-extensive strips of flexible material of substantially invariable length having facing edges spacedly extending alongside each other and forming a gap therebetween, a pair of elongated coil springs of uniform pitch and diameter extending within said gap adjacent said facing edges, respectively, while being secured thereto with spaced-apart turns, at least some of the turns of one of said springs interlinking with corresponding turns of the other of said springs, each of said springs consisting of a plurality of identical resilient coils co-axially interleaved and contacting one another along their entire length, and stop means fastened to said strips at opposite extremities of each of said springs, said stop means including a male element attached to one of said strips and a female element attached to the other of said strips opposite said male element, said female element having an extension bridging said gap and detachably receiving a part of said male element, each of said elements being provided with an edge projecting into said gap, each of said projecting edges having a pair of recesses separated by an inclined tongue, said recesses respectively receiving with freedom of rotation the last two turns of the adjacent extremity of a respective one of said springs, said tongue entering between said last two turns and having a width equal to the spacing between any two consecutive turns of each of said springs, said stop means further including a pair of sleeves respectively attached to said strips at the opposite extremities of said springs and projecting into said gap in alignment with said springs, each of said opposite extremities being provided with a stud rigidly connected therewith and rotatably received in the adjacent sleeve, said stud having a head preventing its withdrawal from the respective sleeve.

13. In a slide fastener, in combination, two substantially co-extensive strips of flexible material of substantially invariable length having facing edges spacedly extending alongside each other and forming a gap therebetween, a pair of elongated coil springs of uniform pitch and diameter extending within said gap adjacent said facing edges, respectively, while being secured thereto with spaced-apart turns, at least some of the turns of one of said springs interlinking with corresponding turns of the other of said springs, each of said springs consisting of a plurality of identical resilient coils of helically wound round wire coaxially interleaved and contacting one another along their entire length while being rigidly interconnected at said extremities, said springs differing from each other in wire thickness and coil diameter but having the same number of turns per unit length, the outer diameter of each coil being substantially equal to 6.667 times the diameter of its wire, and stop means fastened to said strips at opposite extremities of each of said springs, said stop means including a male element attached to one of said strips and a female element attached to the other of said strips opposite said male element, said female element having an extension bridging said gap and detachably receiving a part of said male element, each of said elements being provided with an edge projecting into said gap, each of said projecting edges having a pair of recesses separated by an inclined tongue, said recesses respectively receiving with freedom of rotation the last two turns of the adjacent extremity of a respective one of said springs, said tongue entering between said last two turns and having a width equal to the spacing between any two consecutive turns of each of said springs, said stop means further including a pair of sleeves respectively attached to said strips at the opposite extremities of said springs and projecting into said gap in alignment with said springs, each of said opposite extremities being provided with a stud rigidly connected therewith and rotatably received in the adjacent sleeve, said stud having a head preventing its withdrawal from the respective sleeve.

References Cited in the file of this patent

UNITED STATES PATENTS

| | | |
|---|---|---|
| 1,609,486 | Marinsky | Dec. 7, 1926 |
| 1,721,144 | Blair | July 16, 1929 |
| 1,796,395 | Prentice | Mar. 17, 1931 |
| 1,794,139 | Blair | Feb. 24, 1931 |
| 1,926,217 | Trotter | Sept. 12, 1933 |
| 1,966,255 | Marinsky | July 10, 1934 |
| 2,299,230 | Hanson | Oct. 20, 1942 |
| 2,300,442 | Wahl | Nov. 3, 1942 |
| 2,346,024 | Goldner | Apr. 4, 1944 |
| 2,688,783 | Susskind | Sept. 14, 1954 |
| 2,856,664 | Nagel | Oct. 21, 1958 |

FOREIGN PATENTS

| | | |
|---|---|---|
| 449,098 | Great Britain | June 22, 1936 |
| 816,832 | Germany | Oct. 15, 1951 |
| 941,361 | Germany | Apr. 12, 1956 |
| 453,362 | Italy | Nov. 25, 1949 |
| 222,233 | Switzerland | July 15, 1942 |